UNITED STATES PATENT OFFICE.

DANIEL H. DORSETT, OF CHICAGO, ILLINOIS.

INSULATING MATERIAL.

SPECIFICATION forming part of Letters Patent No. 298,072, dated May 6, 1884.

Application filed August 27, 1883. (No specimens.)

*To all whom it may concern:*

Be it known that I, DANIEL H. DORSETT, of the city of Chicago, in the county of Cook and State of Illinois, have invented a certain new and useful material or compound for insulating telegraphic, telephonic, and other electrical wires, and for constructing conduits, gas, sewer, and water pipes, of which the following is a specification.
The object of my invention is to provide a material or compound for insulating telegraphic, telephonic, and other electrical wires, and for the construction of electrical conduits, sewer, water, gas, and other piping.
To prepare the material I take fifty gallons of coal-tar and distill or evaporate it in a closed or petroleum still, taking therefrom the naphtha and volatile oils by artificial heat, until the residuum, when taken or drawn from the still and cooled, will resist 130° to 140° Fahrenheit heat without softening. The product thus obtained is then placed in a steam-jacketed pan, and ninety pounds of steam applied to the pan until the contents become a liquid.
Then two gallons of crude petroleum paraffine is added to the liquid, and the same mixed thoroughly. I then take one hundred pounds of fine silicious sand and fifty pounds of thoroughly-pulverized coal-ashes and cinders, (the ashes and cinders of bituminous coal being more desirable, as they contain more sulphur,) and mix these thoroughly with the product last obtained, adding thereto thoroughly dry fine silicious sand until the mass is of the required plastic consistency. The material is now in the proper shape for the construction of conduits provided with any number of longitudinal ducts sufficiently large for the reception and withdrawal of single wires, the material, while hot and of the proper consistency, being molded into any desired form, excepting when used for the making of tubes or pipes, which require it to be held in a cylindrical or other form. For such purposes I add to the plastic material before mentioned, while in the mixer, a compound composed of one-half pound of black oxide of manganese and one-fourth pound of ammonia chloride, and thoroughly mix them together. This will harden and oxidize the material, making it suitable to be shaped into tubular form, so that when subjected to ordinary atmospheric heat it will hold its shape and bear handling and transportation.

The paraffine and coal-tar product is a perfect non-conductor of electricity, impervious to moisture, compact, solid, and non-porous, and when mixed with the silicious sand, ashes, and cinders each particle becomes perfectly covered, cemented, and sealed together when tamped or put under pressure and cooled.

My material can be made in any desired length, easy to handle and transport, and can be laid in trenches or any damp place.

In the laying of conduits, pipes, &c., made of my material, the joints or sections can be united together longitudinally by the same material applied hot at the connections, making a continuous water-tight joint as far as laid. The ends of sections to be united are first dipped in the distilled product of the paraffine and coal-tar, and then united by applying the material before mentioned in a heated state, the sections becoming homogeneous one with the other.

Telegraphic, telephonic, and electrical wires can be thoroughly insulated by dipping them into the heated material, when the material will adhere and coat the same, thoroughly insulating the wires, so that they will not be affected by water or moisture.

I have given certain proportions of various ingredients and certain degrees of heat; but I do not wish to be confined to the exact proportions, as they may be varied without departing from the spirit of my invention.

Having described my invention, what I claim as new, and desire to secure by Letters Patent, is—

1. The herein-described insulating compound, composed of coal-tar, paraffine, silicious sand, and pulverized coal-ashes and cinders, in the proportions substantially as set forth, and for the purpose specified.

2. The above-described compound, composed of coal-tar, paraffine, silicious sand, pulverized coal-ashes and cinders, black oxide of manganese, and ammonia chloride, in the proportions substantially as set forth, and for the purpose described.

In testimony whereof I affix my signature in presence of two witnesses.

DANIEL H. DORSETT.

Witnesses:
 CHAS. KRESSMANN,
 FRANK JOHNSON.